H. REINEKE.
COUPLING AND JOINT FOR LEAD PIPE.

No. 186,758.  Patented Jan. 30, 1877.

Witnesses
Andrew J. Humbert
James J. Johnston

Inventor
Henry Reineke

UNITED STATES PATENT OFFICE.

HENRY REINEKE, OF ALLEGHENY, PENNSYLVANIA.

IMPROVEMENT IN COUPLINGS AND JOINTS FOR LEAD PIPES.

Specification forming part of Letters Patent No. 186,758, dated January 30, 1877; application filed February 29, 1876.

*To all whom it may concern:*

Be it known that I, HENRY REINEKE, of the city and county of Allegheny and State of Pennsylvania, have invented new and useful Improvement in Coupling and Joint for Lead Pipe; and I do hereby declare that the following is a full, clear, and exact description thereof, reference being had to the accompanying drawings, and to the letters of reference marked thereon.

My invention relates to an improvement in the construction of joints and couplings for lead pipe; and it consists in providing the female or socket part of the coupling having rectangular sides and bottom, with an internal ring, the periphery and bottom of which are, respectively, parallel with the sides and bottom of the socket, while its exterior is conical, whereby, when the pipe is entered into the coupling, and the male part screwed on, the end of the pipe is spread out on the sides of the ring, which turns in its seat as the coupling is screwed together, and thus the pipe is protected against being cut by the edges of the socket.

To enable others skilled in the art to which my invention relates to make and use the same, I will now proceed to describe its construction and operation.

Figure 1:
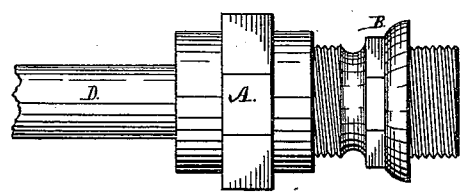
Figure 2:
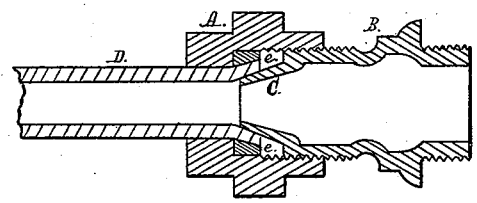
Figure 3:
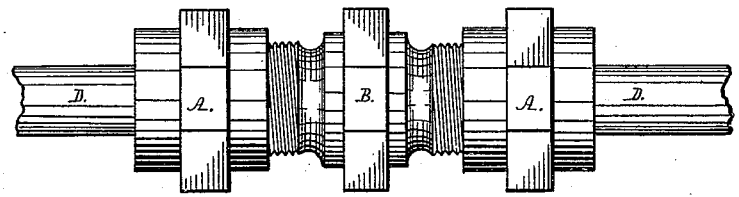

In the accompanying drawings, forming part of this specification, Figure 1 is a side view of my improvement. Fig. 2 is a vertical longitudinal section of the same. Fig. 3 is a side view of my improvement when used for forming a union between two pipes, or a joint in a single pipe; and Fig. 4 is a vertical and longitudinal section of the same.

Referring to the drawings, A represents the female part of the coupling, which is provided with an internal ring, e, having a tapering bore. The female part is made with its sides and bottom at right angles, while the ring has the same form on its exterior surface, so that it fits snugly within the female part, and can turn freely therein without any danger of becoming twisted. The male part of the coupling is provided with a coniform point, C, the taper of which corresponds to the taper of the bore of the ring e.

Figure 4:
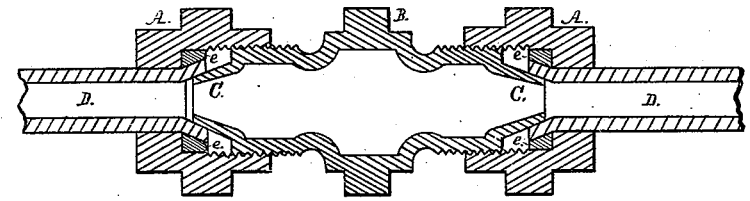

When the coupling is constructed as represented in Figs. 3 and 4, two female parts (each provided with an internal ring) are used, and the male part B is provided with two coniform parts, C.

In forming an attachment or union of the lead pipe D, the ring e is placed in the female part A of the coupling; the lead pipe D is then placed in the bore of the ring, and the end of the pipe slightly spread; the coniform point C of the male part of the coupling is placed in the bore of the lead pipe D; the female part A is then screwed on the male part B, which forces the point C in the bore of the lead pipe, spreading it outward against the inner walls of the ring e uniformly, and making a tight joint.

By using an internal ring in the female part all danger of cutting the pipe is avoided, as the female part turns independently of it, so that all friction is confined to the surface of the ring and the female part.

By having the sides and bottom of the female part and the ring parallel the ring is kept squarely in its seat, and is thus prevented from twisting or getting out of place—a result that would produce injury to the pipe, and prevent a perfect joint from being made.

I am aware that the use of an inner ring in connection with the female part of the coupling is not new, such a device being shown in a patent already granted. I do not, therefore, lay claim, broadly, to such a device; but, as heretofore used, the ring has had no sufficient seat or bearing, and, besides, it presented a sharp edge to the pipe, which, in turning, was liable to cut or wear the pipe away, and the absence of a firm seat or bearing was apt to cause it to become twisted, and thus prevent the female part from turning. These defects my invention is designed to cure.

I therefore claim as my invention—

As an improvement in joints and couplings for lead pipes, the combination and arrangement of the ring e, having a tapering bore, and periphery and bottom at right angles, the female part A, the interior sides and bottom of which are parallel to the sides and bottom of the ring e, furnishing a secure seat for the same, the male part B, having coniform point C, and the lead pipe D, substantially as hereinbefore described and set forth.

HENRY REINEKE.

Witnesses:
ANDREW HUMBERT,
JAMES J. JOHNSTON.